United States Patent Office 3,520,289
Patented July 14, 1970

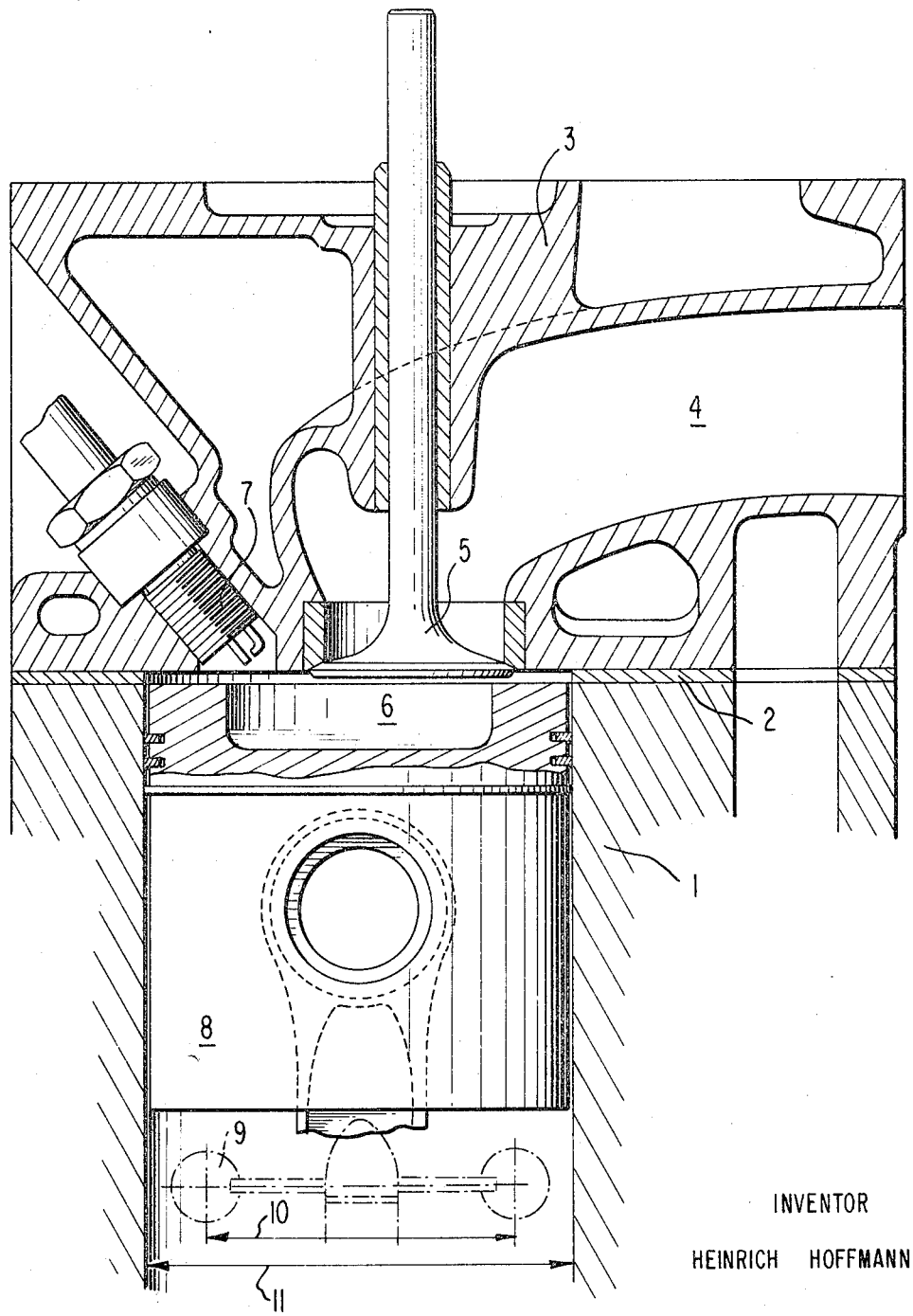

3,520,289
COMBUSTION PROCESS FOR INTERNAL COMBUSTION ENGINES
Heinrich Hoffmann, Stuttgart-Geroksruhe, Germany, assignor to Daimler-Benz Aktiengesellschaft, Stuttgart-Unterturkheim, Germany
Continuation of application Ser. No. 511,456, Dec. 3, 1965. This application Mar. 21, 1968, Ser. No. 715,102
Claims priority, application Germany, Dec. 5, 1964, D 45,991; June 3, 1965, D 47,422
Int. Cl. F02b 23/00
U.S. Cl. 123—191　　　　　　　　　　　　　　17 Claims

ABSTRACT OF THE DISCLOSURE

A combustion process for an internal combustion engine as well as an internal combustion engine for carrying out such process in which an eddying motion about an axis extending in the cylinder longitudinal direction is imparted to the inflowing fuel-air mixture, and in which this eddying motion is displaced substantially completely into the piston combustion chamber during the top-dead-center position of the piston so that an eddying motion with predetermined velocity occurs about the longitudinal axis of symmetry of the piston combustion chamber when the piston is in the top-dead-center position; the eddying motion has preferably a circumferential velocity of 30 to 45 meters per second measured along a diameter corresponding to about ¾ of the cylinder diameter during stationary inflow test into the empty cylinder under a pressure difference of 70 mm. Hg between the suction channel and the interior of the cylinder and with a fully opened inlet valve, while the ratio of circumferential velocity as measured along a diameter corresponding to about ¾ the cylinder diameter to the axial flow velocity in the cylinder is between about 3 and 4.5 during the stationary inflow test.

---

The present application is a continuation application of my parent application Ser. No. 511,456, filed Dec. 3, 1965, now abandoned.

The present invention relates to a combustion process for an internal combustion engine of the type sucking in a fuel-air mixture and operating with timed externally controlled ignition, especially for motor vehicles, in which an eddying or whirling movement is imparted to the inflowing mixture about an axis extending in the longitudinal direction of the cylinder. It is proposed in accordance with the present invention that the eddy or vortex is displaced in the compression top-dead-center position into an axially symmetrical piston combustion chamber accommodating practically the entire compression volume and being axially symmetrical about an axis extending in the cylinder longitudinal direction. It is proposed in particularly by the present invention for the strength of the eddy or vortex that the latter, in a stationary inflow test into the empty cylinder under a pressure difference of 70 mm. Hg between the suction channel and the interior of the cylinder and with a fully opened inlet valve, possesses a circumferential velocity of about 30 to 45 meters per second as measured along a diameter of about ¾ the cylinder diameter.

These measures according to the present invention effectuate an extension of the knocking limit by about two compression units, that is, for example, that a carburetor internal combustion engine of customary construction, which is to be operated with the use of a commercially available fuel having an octane rating of about 90 and with a compression ratio of 9, may be operated without knocking by the application of the combustion process characteristic of the present invention and with the same fuel with compression ratios of 11–12.

Consequently, the present invention permits to exploit more fully the generally known advantages of a higher compression ratio, i.e., primarily of lower fuel consumption. By the converse, the present invention makes it possible to be able to get along with a more inexpensive fuel of lower octane rating at a customary compression ratio, i.e., at a compression ratio as is common today.

The knock-preventing effect of the eddy or vortex may be explained as follows, it being understood that the present invention is not dependent on the accuracy and correctness of such explanation. The unexpected knock-preventing effect of the eddy according to the present invention may be based on the explanation that the "knocking pockets" not yet reached by the flame front after the ignition, in which the mixture is compressed close to the auto-ignition limit and is therewith heated, is forcibly torn away by the eddy before it comes to an auto-ignition. In order to realize this effect to a considerable extent, two things are necessary: The eddy produced by any conventional means such as a suitable suction channel configuration, a deflector valve or the like has to be sufficiently strong, and also has to be present to a still sufficient extent at the decisive moment, namely at the end of the compression stroke. Consequently, a strong eddy or vortex is proposed according to the present invention (of 30 to 45 meters per second in the stationary inflow test), and care is further taken with the aid of the compact piston combustion chamber that the eddy or vortex is again accelerated at the end of the compression stroke by the compression into the piston combustion chamber. It is to be noted in that connection that the compact piston combustion chamber is inherently knock-preventing by reason of the compactness thereof. On the other hand, the eddying must not be excessively large because in that case the friction losses and the losses by heat transfer to the cylinder walls would be excessive during the compression and the combustion.

A further point which merits consideration is the ratio of the eddying to the cylinder filling. It is quite possible to increase the eddying by a corresponding construction of the inlet channel or the like but one then obtains a poorer cylinder filling. Pursuant to a further proposal in accordance with the present invention, the ratio of the circumferential velocity measured along a diameter of ¾ of the cylinder diameter to the axial flow velocity within the cylinder should lie between 3 and 4.5 in the aforementioned stationary inflow test. Below a value of 3, the eddy is so weak that it can exercise its knock-preventing function only to an inadequate extent, and above 4.5 the friction losses become very large in relationship to the poorer filling.

For the size of the diameter of the cylindrically constructed piston combustion chamber, values of 60 to 70% of the piston diameter are recommended in accordance with the present invention as particularly appropriate. With a diameter of more than 80% of the piston diameter, the eddy is no longer sufficiently reinforced at the end of the compression stroke and with a diameter of less than 50%, that proportion of the compression volume which falls onto the gap between the piston and cylinder head becomes too large so that knocking pockets may readily form thereat which can no longer be torn away by the eddy or vortex.

It is additionally proposed in accordance with the present invention that the electrodes of the spark plug be disposed within the cylinder head shortly in front of the separating plane between cylinder head and cylinder and opposite the rim area of the piston combustion chamber. With such a construction of the spark plug, the mixture displayed by the rising piston inwardly toward the piston combustion chamber and rich in fuel as a result of the centrifugal force, flows past the spark plug so that the ignition is initiated thereat with certainty.

Accordingly, it is an object of the present invention to provide a combustion process for internal combustion engines which enables the realization of improved performances with the same fuel.

Another object of the present invention resides in a combustion process for internal combustion engines which permits the use of a higher compression ratio with one and the same fuel or the use of a lower octane fuel with the same compression ratio without any danger of knocking.

A further object of the present invention resides in a combustion process for internal combustion engines which results in lower fuel consumption improved operating performance and elimination of danger of knocking.

Still another object of the present invention resides in the provision of an internal combustion engine permitting the realization of the aforementioned combustion process which at the same time assures good cylinder filling, low losses due to heat transfer to the cylinder walls and practically complete absence of knocking.

A further object of the present invention resides in an internal combustion engine permitting the realization of all the aforementioned aims and objects while at the same time assuring safe initiation of the ignition with an externally controlled ignition system operable to initiate the ignition at a predetermined instant.

These and further objects, features, and advantages of the present invention will become more obvious from the following description when taken in connection with the accompanying drawing, which shows, for purposes of illustration only, one embodiment in accordance with the present invention, and wherein:

The single figure is a partial cross-sectional view through an internal combustion engine in accordance with the present invention, indicating the various parts in their relative scaled dimensions, the drawing indicating one embodiment of the present invention (at a scale of 1:1).

Referring now to the drawing, reference numeral 1 designates therein the schematically illustrated cylinder block. The cylinder head block 3 rests on the cylinder block 1 by the interposition of a conventional seal 2.

The inlet channel is so curved (which is not visible in the indicated cross section) that an eddying movement about a cylinder longitudinal axis is imparted to the fuel air mixture inflowing at the inlet valve 5. Since the configuration of the inlet channel may be of any known construction, a detailed showing thereof is dispensed with herein. The position of the parts is illustrated in the drawing in the upper-dead-center position of the compression stroke in which practically the entire mixture is found within the cylindrical piston combustion chamber 6. Reference numeral 7 designates a spark plug whose electrodes are disposed within the cylinder head 3 shortly in front of the separating plane between the cylinder head block 3 and the cylinder block 1 and opposite the rim area of the piston combustion chamber 6. The piston combustion chamber 6 is approximately rectangular and more particularly is preferably so shaped that the largest vertical cross section of the piston combustion chamber of square shape.

The diameter of the piston combustion chamber 6 is about 50 to 80% of the piston diameter, preferably 60 to 70% of the piston diameter.

For purposes of measuring the intensity of the eddy, the piston 8 is removed and the valve 5 is fixed in its completely open position (with a valve stroke of about 10 mm. in the illustrated embodiment). The suction channel 4 is thereupon connected to a compressed-air source and the pressure is so adjusted that a pressure difference of 70 mm. mercury results between the suction channel and the inside of the cylinder. The penetrating air volume (from which the axial flow velocity can be calculated from the cylinder cross section) is measured in any conventional manner and the circumferential velocity along the diameter 10 is measured with the aid of a conventional anemometer 9, indicated in dash and dot lines, which diameter 10 amounts to about ¾ the cylinder diameter 11. To achieve the desired results of the present invention, the circumferential velocity of the fuel-air mixture is to amount between 30 and 45 meters per second as measured in the manner indicated above. The ratio of circumferential velocity as measured under the stationary inflow test indicated above to the axial flow velocity within the cylinder is preferably between 3 and 4.5. If the aforementioned criteria are fulfilled, the combustion process will take place in such a manner that the aforementioned objects are fully satisfied.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

What is claimed is:

1. A combustion process for an internal combustion engine having a piston combustion chamber, especially for motor vehicles, of the type drawing in the fuel air mixture and operating with externally controlled, timed ignition, in which an eddying movement is imparted to the inflowing mixture about an axis extending in the cylinder longitudinal direction, wherein the improvement comprises displacing the eddying movement about the longitudinal axis in the compression top-dead-center position with a predetermined intensity into the piston combustion chamber, which constitutes practically the entire compression volume and is axially symmetrical about an axis extending in the cylinder longitudinal direction and confining the rotating eddying movement within the piston combustion chamber about the longitudinal axis to a radius of curvature substantially smaller than the radius of the cylinder, the ratio of the circumferential velocity as measured along a diameter corresponding to about ¾ the cylinder diameter, to the axial flow velocity in the cylinder being between about 3 and 4.5 during the stationary inflow test.

2. The process according to claim 1, in which during the stationary inflow test, the ratio of the circumferential velocity as measured along a diameter corresponding to about ¾ the cylinder diameter to the axial flow velocity in the cylinder is between about 3 and 4.5

3. An internal combustion engine, especially for motor vehicles, of the type drawing in the fuel air mixture and operating with externally controlled ignition, which includes cylinder means, piston means within said cylinder means, cylinder head means provided with suction channel means, inlet valve means controlling said suction channel means, said piston means being provided with axially symmetrical piston combustion means symmetrical about an axis extending substantially in the cylinder longitudinal direction, wherein the improvement comprises further means for reducing knocking with a given fuel and thus enabling operation of the engine with higher compression ratios using the same fuel including means for supplying fuel-air mixture through said suction channel means and means for imparting an eddying motion to the inflowing fuel-air mixture about a longitudinal axis of the cylinder means, with said piston combustion chamber means constituting practically the entire compression volume in the compression top-dead-center position of the piston means and with the intensity of the eddying motion and the piston combustion chamber means being so correlated that the eddying, fuel-air mixture is displaced substantially completely into said combustion chamber means in the compression top-dead-center position of the piston means and carries out therein an eddying motion with predetermined velocity about the axis of said piston combustion chamber means, the ratio of the circumferential velocity, as measured along a diameter corresponding to about ¾ the cylinder diameter to the axial flow velocity in the cylinder being between about 3 and 4.5 during the stationary inflow test.

4. The combination according to claim 3, wherein the diameter of the combustion chamber means amounts about to 50 to 80% of the piston diameter.

5. The combination according to claim 3, wherein the diameter thereof amounts to about 60 to 70% of the piston diameter.

6. The combination according to claim 3, wherein the vertical cross section of the combustion chamber means is approximately rectangular.

7. The combination according to claim 3, wherein the largest vertical cross section of the combustion chamber means is substantially square.

8. The combination according to claim 3, further comprising spark plug means including electrodes located within said cylinder head means shortly in front of the separating plane between said cylinder head means and said cylinder means and opposite the rim area of the piston combustion chamber means.

9. The combination according to claim 3, wherein said inlet channel means is so curved that it imparts to the fuel air mixture flowing past the inlet valve means the eddying motion about an axis extending in the cylinder longitudinal direction.

10. The combination according to claim 4, further comprising spark plug means including electrodes located within said cylinder head means shortly in front of the separating plane between said cylinder head means and said cylinder means and opposite the rim area of the piston combustion chamber means.

11. The combination according to claim 9, wherein the vertical cross section of the combustion chamber means is approximately rectangular.

12. The combination according to claim 11, further comprising spark plug means including electrodes located within said cylinder head means shortly in front of the separating plane between said cylinder head means and said cylinder means and opposite the rim area of the piston combustion chamber means.

13. A combustion process for an internal combustion engine having a piston combustion chamber, a suction channel and an inlet valve especially for motor vehicles, of the type drawing in the fuel air mixture and operating with externally controlled, timed ignition, in which an eddying movement is imparted to the inflowing mixture about an axis extending in the cylinder longitudinal direction, wherein the improvement comprises displacing the eddying movement about the longitudinal axis in the compression top-dead center position with a predetermined intensity into the piston combustion chamber which constitutes practically the entire compression volume and is axially symmetrical about an axis extending in the cylinder longitudinal direction and confining the rotating eddying movement within the piston combustion chamber about the longitudinal axis to a radius of curvature substantially smaller than the radius of the cylinder, in which the eddying movement, during stationary inflow test into the empty cylinder under a pressure differential of 70 mm. Hg between the suction channel and the interior of the cylinder and with a fully opened inlet valve, has a circumferential velocity of 30 to 45 meters per second measured along a diameter corresponding to about ¾ of the cylinder diameter.

14. An internal combustion engine, especially for motor vehicles, of the type drawing in the fuel air mixture and operating with externally controlled ignition, which includes cylinder means, piston means within said cylinder means, cylinder head means provided with suction channel means, inlet valve means controlling said suction channel means, said piston means being provided with axially symmetrical piston combustion chamber means symmetrical about an axis extending substantially in the cylinder longitudinal direction, wherein the improvement comprises further means for reducing knocking with a given fuel and thus enabling operation of the engine with higher compression ratios using the same fuel including means for supplying fuel-air mixture through said suction channel means and means for imparting an eddying motion to the inflowing fuel-air mixture about a longituinal axis of the cylinder means, with said piston combustion chamber means constituting practically the entire compression volume in the compression top-dead-center position of the piston means and with the intensity of the eddying motion and the piston combustion chamber means being so correlated that the eddying, fuel-air mixture is displaced substantially completely into said combustion chamber means in the compression top-dead-center position of the piston means and carries out therein an eddying motion with predetermined velocity about the axis of said piston combustion chamber means, said means for imparting an eddying motion producing an eddying motion, during a stationary inflow test into the empty cylinder means at a pressure differential of about 70 mm. Hg between suction channel means and the interior of the cylinder means and with fully opened valve means, that has a circumferential velocity of about 30 to 45 meters per second measured along a diameter of about ¾ the cylinder diameter.

15. An internal combustion engine, especially for motor vehicles, of the type drawing in the fuel air mixture and operating with externally controlled ignition, which includes cylinder means, piston means within said cylinder means, cylinder head means provided with suction channel means, inlet valve means controlling said suction channel means, said piston means being provided with axially symmetrical piston combustion chamber means symmetrical about an axis extending substantially in the cylinder longitudinal direction, wherein the improvement comprises further means for reducing knocking with a given fuel and thus enabling operation of the engine with higher compression ratios using the same fuel including means for supplying fuel-air mixture through said suction channel means and means for imparting an eddying motion to the inflowing fuel-air mixture about a longitudinal axis of the cylinder means, said piston means and said cylinder head means being closely adjacent in the top-dead-center position with said piston combustion chamber means constituting practically the entire compression volume in the compression top-dead-center position of the piston means and with the intensity of the eddying motion and the piston combustion chamber means being so correlated that the eddying, fuel-air mixture is displaced substantially completely into said combustion chamber means in the compression top-dead-center position of the piston means and carries out therein an eddying motion with predetermined velocity about the axis of said piston combustion chamber means, said means for imparting an eddying motion producing an eddying motion, during a stationary inflow test into the empty cylinder means at a pressure differential of about 70 mm. Hg between suction channel means and the interior of the cylinder means and with fully opened valve means, that has a circumferential velocity of about 30 to 45 meters per second measured along a diameter of about ¾ the cylinder diameter.

16. An internal combustion engine according to claim 14, wherein the ratio of the circumferential velocity, as measured along a diameter corresponding to about ¾ the cylinder diameter, to the axial flow velocity in the cylinder is between about 3 and 4.5 during the stationary inflow test.

17. An internal combustion engine according to claim 15, wherein the ratio of the circumferential velocity, as measured along a diameter corresponding to about ¾ the cylinder diameter, to the axial flow velocity in the cylinder is between about 3 and 4.5 during the stationary inflow test.

References Cited

UNITED STATES PATENTS

| | | |
|---|---|---|
| 1,701,537 | 2/1929 | Moore. |
| 2,749,900 | 6/1956 | Mitchell. |
| 3,045,655 | 7/1962 | Formia. |
| 3,104,922 | 9/1963 | Baster. |
| 3,150,654 | 9/1964 | Robison. |
| 3,145,696 | 8/1964 | Baster. |

OTHER REFERENCES

The High Speed Internal Combustion Engine, by Ricardo and Clyde, Third Edition, 1941; Interscience Publishers Inc., New York, N.Y., pp. 122–131.

WENDELL E. BURNS, Primary Examiner

U.S. Cl. X.R.

123—30, 32, 52, 75, 188 193